March 31, 1964 D. A. BISHOP 3,127,526

FEEDBACK AMPLIFIER EMPLOYING TUNNEL DIODE

Filed Aug. 15, 1961 2 Sheets-Sheet 1

INVENTOR.
DAVID A. BISHOP
BY Karl A. Ohralik
ATTORNEY.

March 31, 1964 D. A. BISHOP 3,127,526

FEEDBACK AMPLIFIER EMPLOYING TUNNEL DIODE

Filed Aug. 15, 1961

2 Sheets-Sheet 2

United States Patent Office 3,127,526

Patented Mar. 31, 1964

3,127,526
FEEDBACK AMPLIFIER EMPLOYING TUNNEL DIODE

David A. Bishop, Lexington, Ky., assignor to International Business Machines Corporation, New York, N.Y., a corporation of New York Filed Aug. 15, 1961, Ser. No. 131,657
6 Claims. (Cl. 307—88.5)

This invention relates to an electronic amplifier circuit capable of producing a low potential output for input potentials lower than a predetermined value and a distinct, sharply increased output potential for input potentials to any extent greater than such predetermined value.

In various electronic apparatus for performing logical functions and employing the binary system of numbers, the binary numbers "0" and "1" are frequently represented by potential levels. It is common to represent binary "0" by zero potential and binary "1" by a positive potential of a predetermnied value.

In representing numbers in this manner, it is important that the potentials corresponding to the two numbers be clearly and unmistakably different and thus, it is important that the potentials be separated by distinct, discrete magnitudes. In certain such logic circuits, at some stage of the circuit, the potentials representing binary information may be very low and may differ by a correspondingly low magnitude. A typical circuit in which this is the case is a magnetic core "reader" from which binary "0" and "1" may be "read." For raising the potentials to more tractable values, it is customary to amplify these potentials. The output potentials of such amplifiers are frequently not distinctly different whereby difficulty may arise in discerning the binary digits. This is particularly so in transistorized amplifiers wherein it is necessary to operate the transistors at nonlinear characteristics thereof. A certain amount of improvement may be achieved by the usual regenerative feedback arrangements but even these decrease the discrimination level only slightly. Still another arrangement for improving the discrimination level incorporates a pulse-shaping, monostable multivibrator to which is applied the amplifier output. This combination, however, is not susceptible to easy adjustment for operating at different potential operating points.

Accordingly it is a principal object of this invention to facilitate the effective discrimination between different potentials of a relatively small difference.

It is another object of this invention to facilitate the amplification of low potentials representing binary digits "0" and "1" and producing distinctly different larger potentials representing the binary digits.

It is another object of this invention to facilitate effective potential discrimination by relatively simple circuitry, readily and easily adjustable for operation at different potential operating points.

The foregoing and other objects, features and advantages of the invention will be apparent from the following more particular description of preferred embodiments of the invention, as illustrated in the accompanying drawings.

Figure 1:
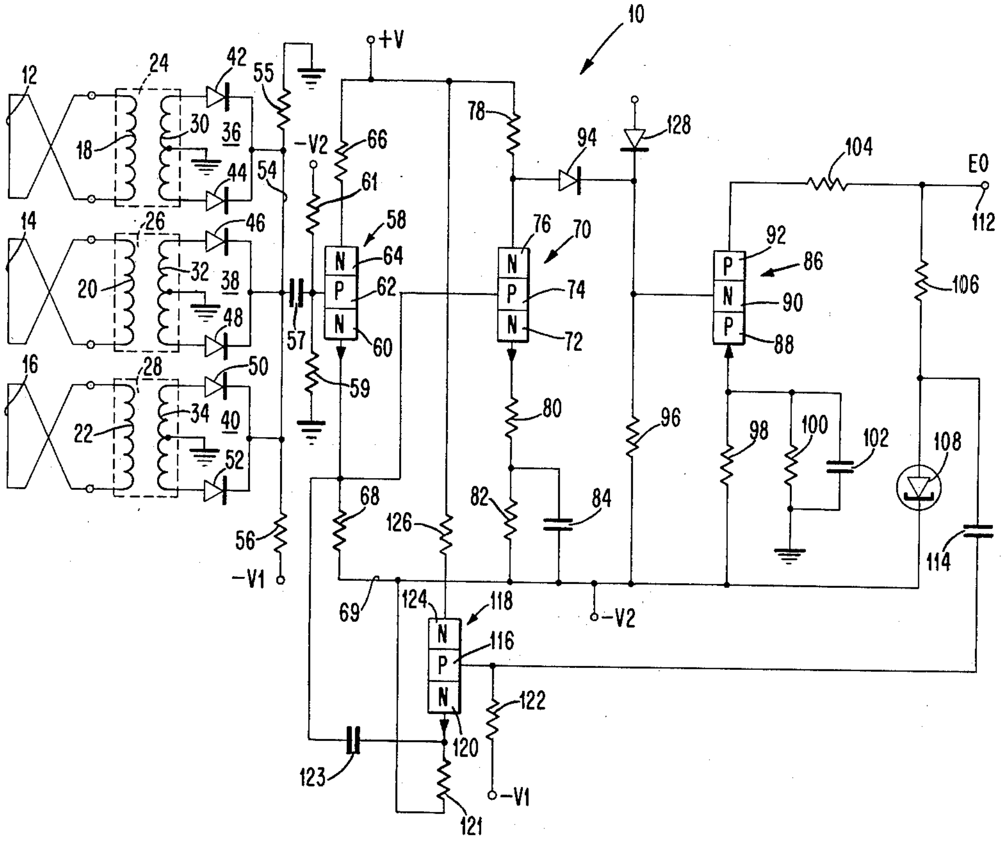
Figure 2:
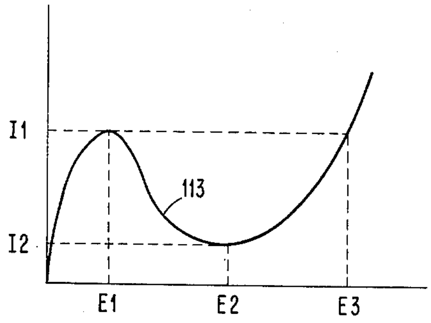
Figure 3:
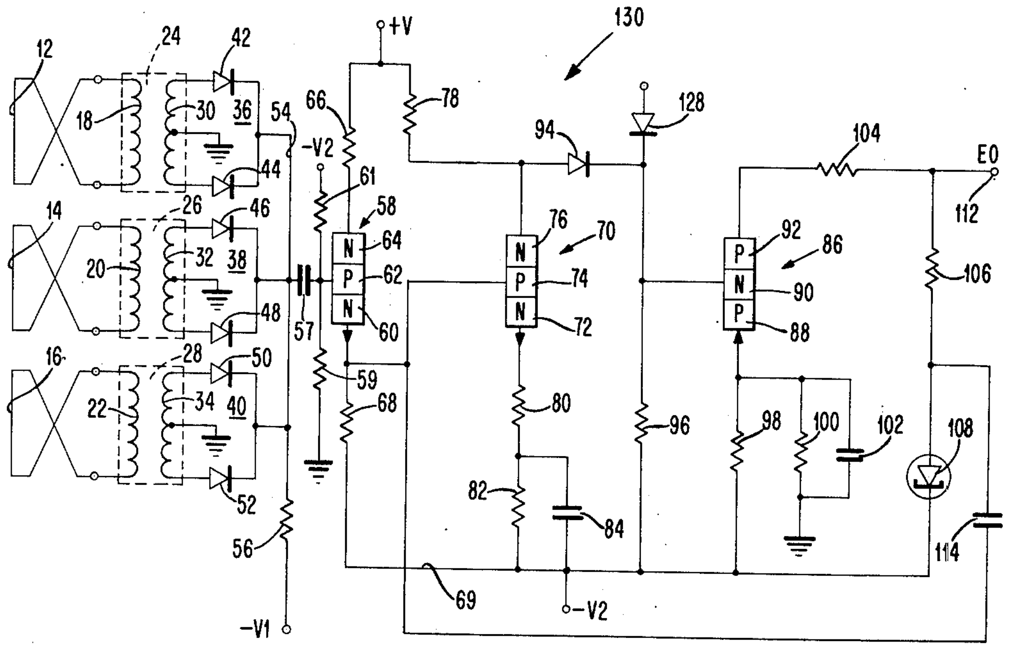

FIGURE 1 is a schematism of an electrical circuit incorporating one embodiment of the present invention, FIGURE 2 is a graph useful in explaining the operation of the invention and illustrating the resistance or potential versus current characteristics of a tunnel diode device included in the circuits of the invention, and FIGURE 3 is a schematism of an electrical circuit incorporating a modification of the invention shown in FIGURE 1.

Referring now to the drawings for a detailed description of the invention, and initially to FIGURE 1, the reference numeral 10 represents generally a circuit in which the present invention may be incorporated. Input signals to the circuit may be derived from any one of a plurality of core array sense windings, three representative ones of which are shown at 12, 14 and 16. It is to be understood that any practical number of additional windings may be provided as the situation may require. The windings 12, 14 and 16 are connected across respective primary windings 18, 20 and 22 of transformers 24, 26 and 28 which, for purposes of enhancing the signals applied to the primary windings, have respective secondary windings 30, 32 and 34 of a greater number of turns than the number of turns of primary windings. The signal potentials induced in the windings 12, 14 and 16 may be of either polarity since the corresponding cores may be magnetized in either of two directions and therefore, the potential at the respective secondary windings may be in either of two polarities. For deriving a positive polarity pulse from the secondary windings irrespective of the potential polarity at the secondary winding, full wave rectifier circuits 36, 38 and 40 are provided for rectifying the signals from the respective secondary windings. These rectifiers have respective pairs of unidirectional diodes 42 and 44, 46 and 48, and 50 and 52 and in each case the anode, represented by the triangular form, is connected to one terminal of the corresponding secondary winding and the cathodes of each pair, represented by the straight lines, are directly joined to each other and to the cathodes of other pairs to form a rectifier output line 54. Each of the secondary windings 30, 32 and 34 are center tapped and connected to ground. The sensing of a signal by any of the sense windings 12, 14 or 16 is effective to induce a potential in such winding which potential is applied across a rectifier load resistor 55 connected between the output line 54 and ground. For improving forward recovery of the diodes, a trickle of current is established in each by a potential divider including potential source —V1 and a resistor 56 in series with resistor 55.

The pulse potential developed across the resistor 55 is applied to an emitter follower stage including a transistor 58 of the NPN type having an emitter 60, a base 62 and a collector 64. An operating bias potential is applied to base 62 from the junction of resistors 59 and 61 connected serially between potential source —V2 and ground. Line 54 is connected through a capacitor 57 to base 62 for applying the rectified pulse signals thereto. A direct potential is applied to collector 64 through a resistor 66 having one terminal connected to collector 64 and its other terminal connected to a source of positive potential represented by the symbol +V. The output of the emitter follower stage is developed across a resistor 68 connected between emitter 60 and a line 69 which, in turn, is connected to a source of negative potential represented by —V2. The emitter follower circuit presents a high input impedance substantially matching the sense winding impedances reflected through the transformers for deriving maximum effect from the sense windings which present relatively weak signals even after being enhanced by the step-up transformers.

An amplifier stage receives the output potential from the emitter follower and includes a transistor 70 of the NPN type having an emitter 72, a base 74 and a collector 76. The base 74 is directly connected to emitter 60 of the emitter follower stage and receives potential signals and bias potentials appearing at this emitter. A direct positive potential bias is applied to collector 76 from source +V by a connection through a resistor 78 between this collector and the source +V. Direct potential bias is applied to emitter 76 through a pair of resistors 80 and 82 serially connected between line 68 and emitter 72 and a capacitor 84 is connected across resistor 82 for bypassing high frequency currents.

The output potential of the amplifier stage including transistor 70 is developed across resistor 78 and is an inversion of the signal applied to base 74, in the sense that it is of opposite phase to such input signal. Since the input pulses applied to base 74 are of positive polarity, the potential pulses at the output of the amplifier stage are of negative polarity.

The negative potential pulses derived at collector 76 are further amplified by a transistor 86 of the PNP type having an emitter 88, a base 90 and a collector 92. For applying the pulses to the base 90, a unidirectional diode 94 is provided and has its anode connected to collector 76 and its cathode connected to base 90. The positive bias potential of collector 76 is applied also to the anode of diode 94 and the negative bias potential applied to base 90 through resistor 96 connected between this base and line 69, is also applied to the cathode of diode 94. The potential —V2 is sufficiently great so as to bias the diode in the forward direction, that is, with its anode positive with respect to its cathode. Even with the maximum negative "swings" of the collector 76, the diode is still forwardly biased. Thus, the negative pulses are passed through the diode.

Transistor 86 has direct bias potentials applied thereto which maintain this transistor cut off in the absence of an applied signal pulse. A pair of resistors 98 and 100 are serially connected between line 69 and ground and the junction between these resistors is connected to emitter 88. A capacitor 102 is connected across resistor 100 for bypassing high frequency currents. It should be noted that the operating point of transistor 86, or stated otherwise, the base potential at which this transistor becomes conductive can be controlled by the proportioning of resistors 98 and 100. For deriving an output potential from transistor 86, a pair of resistors 104 and 106 and a diode 108 are serially connected in the order named between collector 92 and line 69 with the cathode of the diode connected to line 69. An output terminal 112 is connected to the junction between resistors 104 and 106.

The diode 108 is of the type commonly called a tunnel diode and has a current versus potential characteristic as represented by the curve 113 shown in the graph of FIGURE 2. In this figure, the abscissa represents potential across the diode and the ordinate represents current through the diode. It is noted in this figure that from a potential of substantially zero to a higher potential E1, the current through the diode reaches a maxima I1, from potential E1 to a higher potential E2 the current through the diode progressively diminishes to a minima value I2 and that for potentials higher than E2, the current progressively increases. Thus, for potentials from zero to E1 and from E2 higher, the diode 108 exhibits a positive resistance characteristic while for potentials in the range from E1 to E2, the diode exhibits an unstable negative resistance characteristic.

In accordance with a feature of this invention, this phenomena is exploited to provide a sensitive circuit providing a low output potential for input signals to base 90 less than a certain value and a distinctly greater output potential for input signals slightly greater than this certain value. In the operation of this amplifier stage, the proportioning of parameters is such that in the absence of an input signal, a current of a value very nearly equal to zero is passed by transistor 86 through resistors 104 and 106 and diode 108. The application of an input signal to the base 90 of transistor 86, however, has the effect of causing conduction in this transistor. For even signals of slightly larger magnitude than a predetermined value, the current is increased to a value greater than I1 and as clearly seen in FIGURE 2, the potential across the diode suddenly increases to a value E3. In effect, a significant positive potential pulse is produced across the diode 108. In accordance with this embodiment of invention, this potential pulse is regeneratively fed back to the amplifier stage including transistor 70 to even further enhance the output potential. Thus, the junction between resistor 106 and diode 108 is connected through a capacitor 114 to the base 116 of a transistor 118 of the NPN type. The transistor 118 also includes an emitter 120 connected to line 69 through a resistor 121. A negative bias potential is applied to base 116 through a resistor 122 connected between source —V1 and base 116. A collector 124 is connected through a resistor 126 to emitter 76. The transistor 118 and directly associated circuitry is effective as an emitter follower stage and its emitter is connected to emitter 60 and base 74 through a capacitor 123. Thus, the potential pulse fed back through capacitor 114 and transistors 70 and 86 and associated circuitry amplify this pulse even further. For appropriately gating the amplifier stage including transistor 86, a suitable gating pulse may be applied to base 90 of output transistor 86 through a diode 128 having its cathode directly connected to base 90.

In accordance with this invention, a very slight increase in negative potential at base 90 is effective to produce a current through diode 108 large enough to cause its resistance to suddenly increase to produce a large potential feed back to a preceding stage which further amplifies such pulse to produce a relatively large output pulse at terminal 112. Thus, discrimination between potentials differing by relatively small magnitudes is more effectively accomplished.

In accordance with another embodiment of this invention as shown generally at 130 in FIGURE 3 of the drawings and wherein similar parts are designated by the same numbers, the potential developed across tunnel diode 108 may be fed back directly to the stage including transistor 70 rather than through the additional amplifying transistor 118. To this end, the junction between diode 108 and resistor 106 is connected through capacitor 114 to base 74 of transistor 70. In accordance with this embodiment of the invention, a large step in output potential is still produced in response to a slight increase in potential at base 90 of transistor 86.

The manner in which the present invention may be incorporated in a multistage amplifier has been described hereinabove. However, it is also within the purview of this invention to incorporate a tunnel diode element in the output circuit of a single stage amplifier and applying the signal developed across such tunnel diode to the input of the same stage. In this case due consideration must, of course, be given to the provision of means for inversion of the feedback signal to apply the same to the input in a regenerative phase.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit comprising a plurality of amplifier stages each including an output load impedance, a tunnel diode element exhibiting a positive resistance characteristic over a pair of potential ranges and a negative resistance characteristic over a potential range intermediate to said potential ranges, one of said stages being responsive to a range of potentials applied to its input to produce output potentials within another range, said element being interposed in series with the load impedance of said one of said stages, and means for positively feeding back the potential developed across said element to the input of a stage of said amplifier.

2. A circuit comprising a plurality of amplifier stages each including an output load impedance, a tunnel diode element exhibiting positive resistance characteristics over one potential range and over a higher potential range and exhibiting a negative resistance characteristic over a potential range intermediate to said potential ranges interposed in series with the output load impedance of one of said stages, said characteristic being continuous between said first and intermediate ranges and the rate of change of current with respect to potential being zero at a predetermined value of current, said one stage being responsive to a range of potentials applied to its input to produce output potentials within another range, means regeneratively coupling the output of said one stage to the input of a preceding stage whereby the operation of said one stage about said predetermined value of current is effective to produce a load impedance of relatively low value at currents less than said predetermined value and a load impedance of relatively high value at currents greater than said predetermined value to produce a large feed back potential from said one stage to said preceding stage for current changes in said diode element from less than said predetermined value to greater than said predetermined value.

3. A circuit comprising a plurality of amplifier stages each including an active circuit device having an input element and an output element, means coupling the output element of one of said devices to the input element of another of said devices, said other device being responsive to a range of potentials applied to its input to produce output potentials within another range, a load impedance coupled to the output element of said other device, said load impedance including a diode having a characteristic within said other range and including a positive resistance characteristic over a pair of potential ranges and a negative resistance characteristic over a potential range intermediate to said pair of potential ranges, means coupling said diode to the input element of said one device, whereby the operation of said diode to cause changes from a relatively low impedance to a relatively high impedance in response to transition from a positive resistance characteristic to a negative resistance characteristic is effective to produce an increased feedback potential from said other device to said one device.

4. A circuit comprising a first amplifier stage and a second amplifier stage each including an active circuit device having an input element and an output element, a load impedance connected to the output element of each device to produce an output potential by current flow from the device through the load impedance, said other device being responsive to a range of potentials applied to its input to produce output potentials within another range, the load impedance connected to said second device including a diode having a characteristic within said other range and including a positive resistance characteristic over a pair of potential ranges and a negative resistance characteristic over a potential range intermediate to said pair of potential ranges, the rate of change of potential across said diode with respect to the rate of change of current therethrough being substantially infinite between each of said pair of ranges and said intermediate range, means coupling the output element of said second device to the input element of said first device whereby a change in current in said second device and said diode from less than a predetermined value to more than said predetermined value is effective to change said diode from a low resistance to a high resistance character and the current therethrough produces a high feedback potential to the input element of said first device.

5. A circuit comprising a first amplifier stage and a second amplifier stage each having an active circuit device with an input element and an output element, a load impedance connected to each of said output elements for producing an output potential thereacross in response to the flow of current therethrough from the active circuit device, means coupling the output electrode of the device in said first stage to the input electrode of the device in said second stage, said second device being responsive to the range of potentials applied to its input to produce output potentials within another range, the load impedance connected to the output electrode of the device in said second stage including a diode having a characteristic within said other range positive resistance characteristic over a pair of potential ranges separated by a negative resistance characteristic over a potential range intermediate to said pair of potential ranges, said diode having a substantially infinite rate of change of potential thereacross at a predetermined value of current passing therethrough and at a potential between one of said pair of ranges and said intermediate range and a positive resistance characteristic at said predetermined current and a potential in the other of said pair of ranges whereby the change in current through the device of said second stage from less than said predetermined value to more than said predetermined value is effective to change the potential thereacross from a potential in one of said pair of ranges to the other of said pair to produce a potential feedback pulse to the input electrode of said device in said first stage.

6. An electrical circuit comprising means for amplifying an electrical signal and including an element in the output circuit of said amplifying means, said element exhibiting a positive resistance characteristic over a pair of ranges and a negative resistance characteristic over a range intermediate said pair of ranges, said amplifying means being responsive to potentials within another range encompassing said pair of ranges, said element assuming a resistance state to provide a relatively high potential when said amplifying means supplies a potential within the upper of said pair of ranges, and means for feeding back the potential developed across said element to the input circuit of said amplifier means to enhance the operation of said electrical circuit.

References Cited in the file of this patent

Akmenkalns: IBM Technical Bulletin, volume 3, No. 5, October 1960.

Wohlfort et al.: IBM Technical Disclosure Bulletin, vol. 3, No. 4, September 1960.